No. 817,632. PATENTED APR. 10, 1906.
J. M. DODGE.
SPROCKET WHEEL.
APPLICATION FILED MAY 23, 1898.

2 SHEETS—SHEET 1.

Witnesses.

Inventor:
James M. Dodge
by his Attorneys

No. 817,632. PATENTED APR. 10, 1906.
J. M. DODGE.
SPROCKET WHEEL.
APPLICATION FILED MAY 23, 1898.

2 SHEETS—SHEET 2.

Witnesses:
Jos. H. Klein
Harry Smith

Inventor:
James M. Dodge
by his Attorneys
Howson & Howson

UNITED STATES PATENT OFFICE.

JAMES M. DODGE, OF PHILADELPHIA, PENNSYLVANIA.

SPROCKET-WHEEL.

No. 817,632.   Specification of Letters Patent.   Patented April 10, 1906.

Application filed May 23, 1898. Serial No. 681,467.

*To all whom it may concern:*

Be it known that I, JAMES M. DODGE, a citizen of the United States, residing in Philadelphia, Pennsylvania, have invented certain Improvements in Sprocket-Wheels for Drive-Chains, of which the following is a specification.

The object of my invention is to so construct a sprocket-wheel for drive-chains that chains having different pitches may be adapted to the same sprocket-wheel, thereby dispensing with the usual practice of accurately fitting each chain-link to the wheel. This object I attain in the following manner, reference being had to the accompanying drawings, in which—

Figure 1:
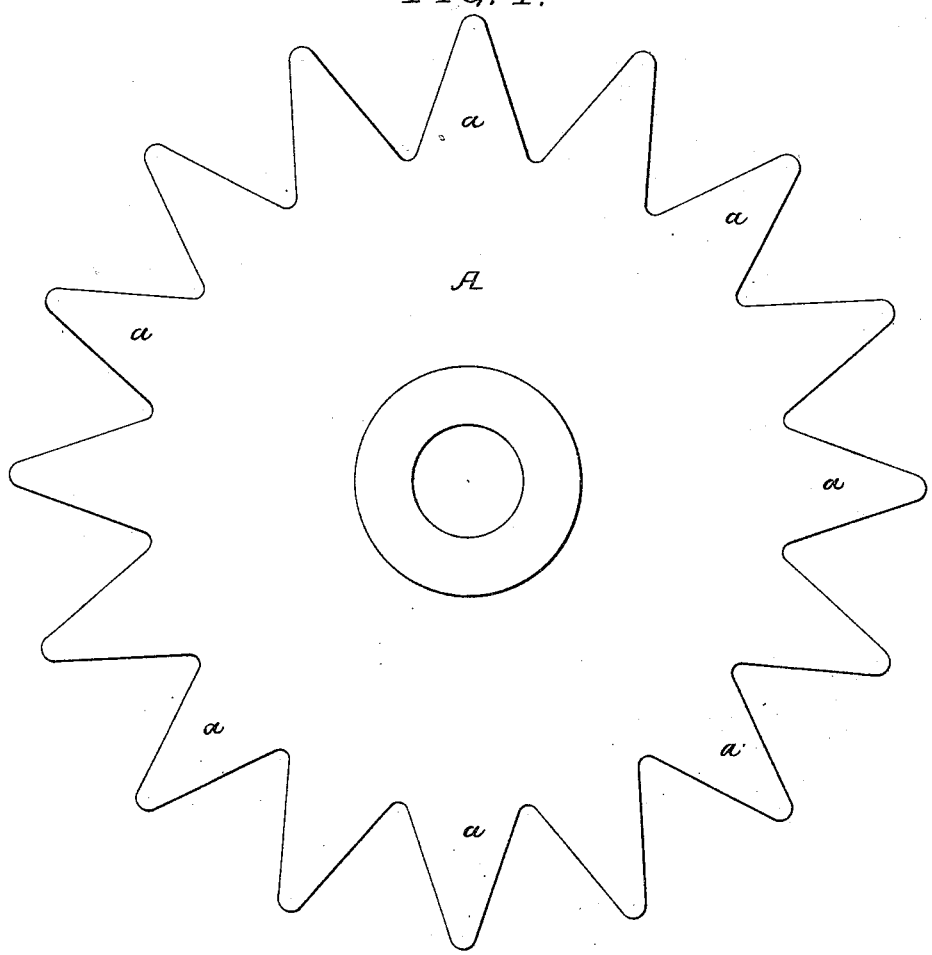
Figure 2:
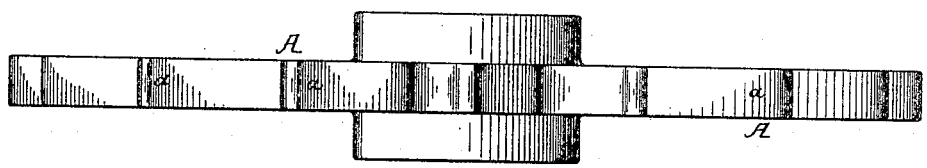
Figure 3:
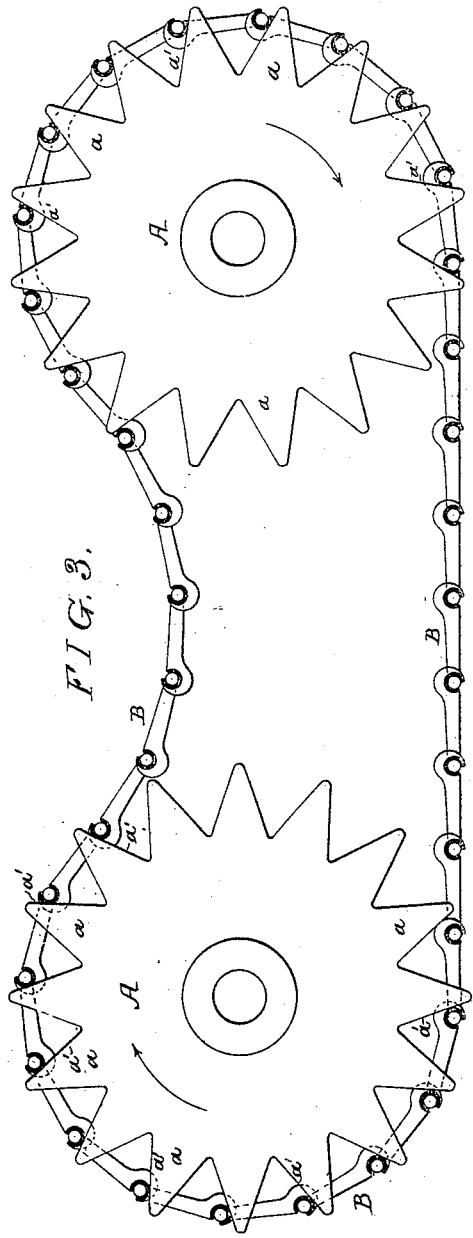
Figure 4:
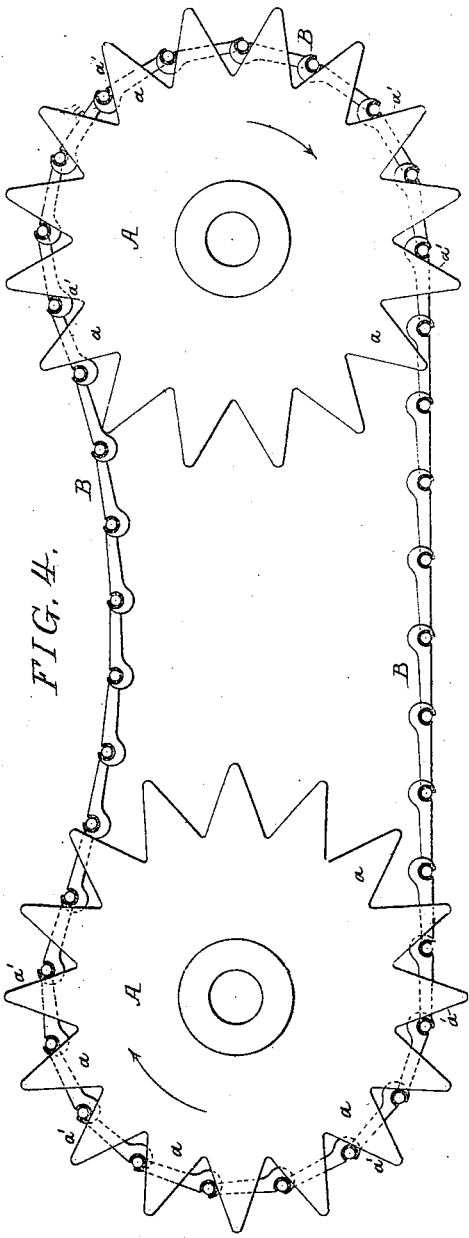

Figure 1 is a face view of my improved sprocket-wheel. Fig. 2 is an edge view. Fig. 3 is a view showing a driving and driven wheel with a link drive-chain thereon having links of one size; and Fig. 4 is a view similar to Fig. 3, showing links of another size.

Heretofore in the manufacture of drive-chains and sprocket-wheels therefor great care had to be exercised in fitting a chain to a sprocket-wheel, and each wheel had to be tested and fitted accurately to each link of a chain before it was placed in position for actual use. Consequently the expense of manufacture was increased and it was impossible to substitute one wheel for another without accurately fitting it to the chain.

By my invention I am enabled to place a chain on a sprocket-wheel without special fitting, which chain will run accurately on the bearing-surface of the teeth and without undue wear or friction.

A is the wheel, which may be of any diameter and of the shape shown, and this wheel has in the present instance a series of V-shaped teeth $a$ with the same bevel on one side as on the other, so that the wheel can be reversed, as the chain when running on the wheel only bears upon one surface of the tooth.

As shown in Fig. 3, the chain B rests against the inclined surface $a'$ of each tooth, the chain being the ordinary form of detachable link chain having a socket at one end and a bar at the opposite end adapted to the socket of the adjoining link. It will be seen that the periphery of the socket alone bears upon the surface of the tooth and that the cross-bar swivels in the socket, so that when the link seats itself on the wheel there is no motion, and as the chain leaves the wheel the angle is such that as soon as the link swings on its pivot the socket will at once leave the bearing-face of the tooth. Consequently there is very little abrasion of the teeth. In the manufacture of such chain-links the length of the links differs materially owing to the differences in the material or process of manufacture, and it is this feature that makes it almost impossible to make a sprocket-wheel of the usual character having teeth which will accurately fit the links of the chain. By making the bearing-face $a'$ of the teeth of the wheel at such an angle that the chain will find its own pitch-line and the teeth will resits thrust toward the axis of the wheel, as well as the pulling strain, I entirely overcome the difficulty above mentioned in fitting the chain to the sprocket-wheel, as the several links of the chain will accommodate themselves to the wheel and seat themselves properly thereon, and as the teeth and chain wear they will accommodate themselves to the difference, so that the relation between the wheel and the chain is always the same.

In Fig. 3 I have shown adapted to the wheel a chain having long links, and it will be noticed that the pitch-line of the chain is near the periphery of the wheel, whereas in Fig. 4 I have shown a chain having short links adapted to the teeth of the wheel and the pitch-line is nearer the center of the wheel; but it will be noticed that in either case the chain rests solely upon the inclined bearing-face of the tooth. The gullet between the teeth is so deep that a chain that would free itself in passing off of the wheel could not possibly seat itself in the base of the gullet.

Sprocket-wheels as usually made have a root diameter which is the line of rest for the links of the chain, whereas in my improved sprocket-wheel the angular surfaces of the teeth provide the sole support for the links of the chain, and the ordinary chain is used—that is to say, a chain having open rectangular links with the line of articulation of the links within the outside diameter of the wheel—no especial form of chain being necessary.

Having thus described my invention, I claim and desire to secure by Letters Patent—

1. The combination in a sprocket-wheel having a series of V-shaped teeth all lying in the same plane, with an open-link chain arranged to pass around said wheel, the teeth of the wheel extending into the open links of the chain and the transverse members of the chain bearing against the teeth, substantially as described.

2. The combination of a sprocket-wheel having a single series of teeth, each tooth having a plane bearing-surface inclined to the radius of the wheel, with an open-link chain arranged to bear upon the wheel in the arc of a circle and having its successive links so constructed that the transverse members of the links will bear against the plane surface of successive teeth, substantially as described.

3. The combination of a sprocket-wheel having a single series of teeth, each tooth having a plane bearing-surface inclined to the radius of the wheel, with an open-link chain arranged to pass around the wheel, the teeth of the said wheel passing through the open links of the chain and the bearing-points being on the pitch-line of the chain, substantially as described.

In testimony whereof I have signed my name to this specification in the presence of two subscribing witnesses.

JAMES M. DODGE.

Witnesses:
  HENRY HOWSON,
  JOS. H. KLEIN.